United States Patent [19]

Lefebvre et al.

[11] Patent Number: 5,263,747
[45] Date of Patent: Nov. 23, 1993

[54] MEANS FOR AND METHODS OF ATTACHING METAL HOSES TO END FITTINGS

[75] Inventors: Kenneth E. Lefebvre, Hampden; Arthur J. Bessette, Hampshire, both of Mass.

[73] Assignee: Titeflex Corporation, Springfield, Mass.

[21] Appl. No.: 835,285

[22] Filed: Feb. 13, 1992

[51] Int. Cl.⁵ ............................................. F16L 27/10
[52] U.S. Cl. ................................ 285/226; 285/903; 285/919
[58] Field of Search ............. 285/226, 903, 229, 227, 285/919, 149

[56] References Cited

U.S. PATENT DOCUMENTS

| | | | |
|---|---|---|---|
| 1,797,151 | 3/1931 | Lord | 285/226 |
| 2,014,355 | 10/1935 | Hussman | 285/226 X |
| 2,216,468 | 10/1940 | Farrar | 285/226 X |
| 2,444,988 | 7/1948 | Guarnaschelli | 285/226 X |
| 2,516,631 | 7/1950 | Jacobson | 285/149 |
| 2,666,657 | 1/1954 | Howard et al. | 285/226 X |
| 2,886,885 | 5/1959 | Reid, Jr. | 285/226 X |
| 3,135,295 | 6/1964 | Ziebold | 285/226 X |
| 3,232,640 | 2/1966 | Donkle, Jr. | 285/226 X |
| 3,527,481 | 9/1970 | Lewis | 285/226 X |
| 3,556,568 | 1/1971 | King | 285/226 X |
| 3,627,354 | 12/1971 | Toepper | 285/226 X |
| 3,692,337 | 9/1972 | Mischel | 285/226 |
| 4,229,028 | 10/1980 | Gray | 285/383 X |
| 4,415,185 | 11/1983 | Vinciguerra et al. | 285/226 X |
| 4,445,332 | 5/1984 | Thies et al. | 285/226 X |
| 4,645,244 | 2/1987 | Curtis | 285/226 X |
| 5,058,934 | 10/1991 | Brannon | 285/226 |
| 5,145,215 | 9/1992 | Udell | 285/226 |

FOREIGN PATENT DOCUMENTS

| | | | |
|---|---|---|---|
| 1928177 | 12/1970 | Fed. Rep. of Germany | 285/149 |
| 804583 | 11/1958 | United Kingdom | 285/149 |

Primary Examiner—Eric K. Nicholson
Assistant Examiner—Heather Chun
Attorney, Agent, or Firm—Louis Bernat

[57] ABSTRACT

An end of a convoluted metal hose is connected to an adaptor having an end surface which is rounded to complement a contour of an endmost convolution. A straight section of the convoluted hose extends unbonded some distance through a bore in the adaptor, where it is welded in place. This way any flexing is by a section of the wrapping over the rounded end, the wrapping section being remote from any heat damage which may result from the welding. The internal transition between the bores of the hose and adaptor is straight and smooth, free of any crevice.

8 Claims, 1 Drawing Sheet

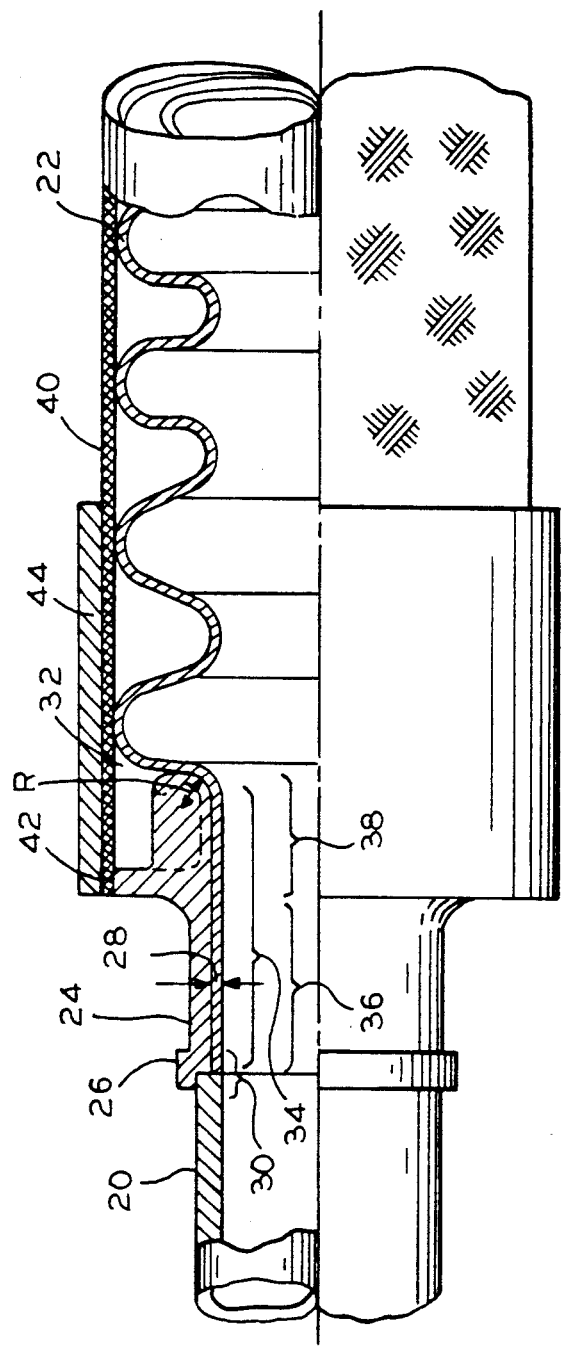
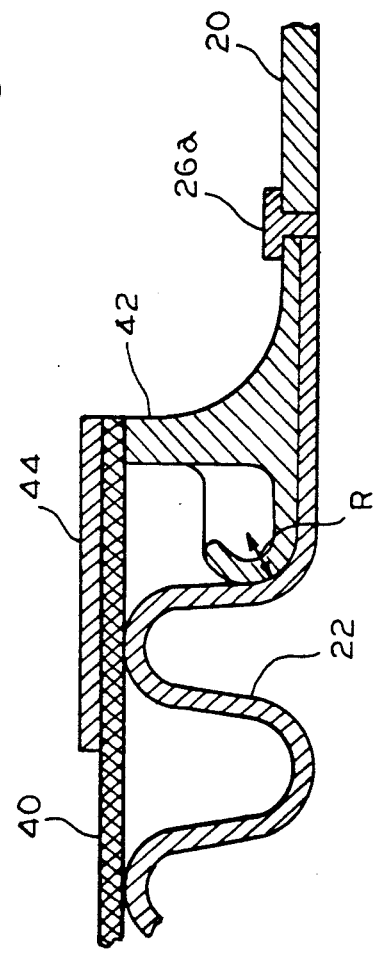
FIG. 1
FIG. 2

MEANS FOR AND METHODS OF ATTACHING METAL HOSES TO END FITTINGS

This invention relates to end fittings for convoluted metal hoses and more particularly to end fittings which can absorb violent vibrations at extremely high temperatures, such as might be encountered on an operating jet engine.

BACKGROUND OF THE INVENTION

Convoluted metal hose assemblies of the described type are used primarily in the aerospace industries, usually at temperatures well above 450° F., although the official specifications require the hose to withstand violent and resonant vibrations at 850° F. Primarily—but not exclusively—these hoses are often used to bleed off hot exhaust gases from areas of very high engine temperatures. These bled off gases might be used to monitor engine performance, for example. Therefore, a failure of the metal hose could spell a catastrophic failure of the entire aerospace vehicle. In addition, the bled off gas may also be used for de-icing a wing, preheating engine fuel, transferring exotic hyperbolic fuels, and the like.

For many reasons, these hoses are subjected to very high levels of vibrations, sometimes causing them to go into resonant vibrations. Therefore, the energy of such vibrations has to be absorbed, generally at the fitting interface, which is an area (usually very small) where a flexing body is transformed into a stiff and non-flexing body. Sometimes there is a sudden stiffness in the convoluted hose, which is caused by pressure surges of internal fluids. These and other events tend to concentrate material fatigue at fixed locations along the metal hose.

Heretofore, the interface area of hose-to-end fitting attachment has been one where stiff and flexible bodies are welded together so that bending occurs at a fairly sharp edge. The heat produced during the welding operation causes a heat affected zone in the convoluted metal hose which also appears at a point of maximum mechanical stress. These things combine to produce a weakness in the hose that leads to an early failure. Thus, the weld is a point of inherent weakness.

As a result of these considerations, a specification (AS 1424) for the metal hose joint design has been adopted by the commercial aircraft industry. This specification requires vibration testing at 850° F., in combination with dynamic flexing and pressure surging, such as might be encountered in association with a jet engine. To date, it is thought that the assignee of this invention, the Titeflex Corporation, is the only company which has successfully met these specifications, for all sizes of hoses. When the assignee has encountered failures during their tests, they have occurred in the area of the weld or in the area that is heat affected by the welding process.

BRIEF SUMMARY OF THE INVENTION

Accordingly, an object of this invention is to provide new and improved means for and methods of joining convoluted metal hoses to end fittings. Here an object is to exceed all known specifications—especially of the aerospace industry—for such fittings. In particular, an object is to provide the described end fitting which will tolerate flexing up to a 90° arc.

Another object of the invention is to provide improved welding of convoluted, thin wall conduits to end fittings.

In keeping with an aspect of the invention, these and other objects are accomplished by providing a rigid end fitting having an internal bore with a step formed therein which is exactly equal to the thickness of the wall of a metal tube so that, at the transition between the fitting and hose, the inner bore diameter forms a smooth and uninterrupted surface. At the outer end of the end fitting, the step terminates in a radiused end which fits against and conforms to an outside contour on the convoluted hose. Therefore, the hose is free to roll and move against the rounded edge and to thus distribute the bending forces along a length of the hose. Any increase in intimate contact between the hose and this radiused end greatly improves the reliability of the fitting and increases the life cycle of the hose.

The inventive weld joint greatly improves all known prior art joints of the described type, increasing the performance life cycle by a minimum of twice the official specification requirements. Moreover, the inventive weld joint enables a use of orbital, electron beam, and other weld processes, thereby increasing the flexibility of manufacturing processes and especially of automated welding processes.

BRIEF DESCRIPTION OF THE DRAWING

Preferred embodiments of the invention are shown in the attached drawings, in which:

FIG. 1 is a longitudinal, partial cross section view of a hose and end fitting, incorporating the principles of the invention; and FIG. 2 is a fragmentary cross section of an embodiment including a butt welded T-ring which is piloted on both sides.

DETAILED DESCRIPTION OF THE INVENTION

FIG. 1 shows a rigid device 20 which may have any suitable function. For example, it may be a pipe, end fitting, or collar on a larger device for accepting a convoluted metal hose 22, or the like. A convoluted metal hose 22 is connected via the device 20 to any other suitable structure, such as a jet engine, for example. An adaptor 24 is provided to make a transition from the device 20 to the convoluted metal hose 22.

The adaptor 24 has a first end 26 with an offset collar (called a piloted butt welded joint) which fits over the end of device 20 to locate the adaptor exactly relative to the convoluted metal hose. As shown in FIG. 2, the pilot offset 26 may be replaced by a butt weld "T-ring" 26a which is piloted on both ends. The choice of which piloting device is used depends upon the welding technique that is used.

The inside diameter of the offset collar 26 is over-size relative to the inside diameter of device 20 by a step which is exactly equal to the wall thickness 28 of the convoluted metal hose 22. Therefore, when the hose 22 is attached to the end fitting, the area 30 of transition between device 20 and hose 22 is smooth and without any internal discontinuities which might cause turbulence in fluid flowing within the area. Among other things, this smoothness makes a joint which has no crevices that could entrap and accumulate materials within the hose.

The hose end 32 of the adaptor 24 terminates in a smooth curve having a radius R which is substantially equal to a corresponding radius on the convoluted hose 22. Any increase of intimate contact along the radius R greatly improves the damping qualities and capabilities of the end fitting up to a desired 90° arc.

The hose 22 has a straight section 34 which is welded to the adaptor 24 over a restricted length 36, which is remote from the highly stressed area of flexing so that the weakened heated zone is not fatigued by the flexing. The highly stressed area of hose flexing is at an end of another and unwelded length 38 which has not been heated and which is not bonded to adaptor 24. Stated another way, the area of maximum stress is isolated from the heat affected area.

In the area where there is a freedom to flex, the hose may roll over the radius R on end 32 to provide a progressive contact as the hose flexes. Therefore, there is no single point of contact where the hose must bend. The further the flexible part of the hose is from the welded area 36, the less likely is there to be fatigue from the bending.

A basket weave of a stainless steel reinforcing braid 40 fits snugly over the convoluted metal hose 22 and is welded to the adaptor 24 at end 42. A fabric covering may also be provided over the steel wire braid, if desired. Any suitable outer collar or braid retainer 44 slips over the braid and is welded to the adaptor 24 in order to protect the end of the braid where it may fray. This braid retainer 44 is preferably made of any suitable metal, but it may also be made of any material which is compatible with the other materials used in the device.

The drawing shows that the area where the hose-to-adaptor connection is made is a cylindrical length 34 of the adaptor which conforms to a cylindrical length of the hose 22. However, other suitable shapes may also be used. For example, sometimes these areas (either adaptor 24 or hose 22, or both) may be conical.

The described structure lends itself to many different, and especially automatic, welding processes, which makes for inexpensive welding. This welding is simplified since the hose wall thickness 28 exactly matches the depth of a step in the adaptor in area 30. The area of the weld is outside of the flexing portion of the hose assembly so that an after welding inspection thereof is facilitated. The inspection may be visual, radiographic, or made by a fluoro penetrant. Therefore, the invention has significant advantages over the prior art hose terminations in durability, flow characteristics, weld inspection, and simplicity, and in freedom from crevices for collecting debris.

Those who are skilled in the art will readily perceive how the principles set forth above may be modified and adapted. Therefore, the appended claims are intended to cover all equivalent structures falling within the scope and the spirit of the invention.

The claimed invention is:

1. A termination for a convoluted metal hose, which greatly increases the durability of the metal hose to fitting attachment transition, said termination comprising an elongated device having a bore with an internal step, said hose being bonded along a first length beginning at said step, the height dimension of said step being substantially equal to a wall thickness of said hose in order to provide a smooth and unbroken transition between said bore and said hose at the location of said bonding, said bore terminating in an end having a radius which is substantially equal to a radius of a convolution on said metal hose whereby said metal hose and adapter make a mutual rolling contact over an area of said radius where said hose flexes, said hose being unbonded in a second length terminating adjacent the end radius whereby flexing of said hose is distributed over an area of progressive contact with said radius and is not concentrated in a single location.

2. The termination of claim 1 and a pilot end means on said device for centering said bore of said device with a bore on an adjacent structure.

3. The termination of claim 2 wherein said pilot end is a T-ring which is piloted on both ends.

4. The termination of claim 1 and a basket weave of braid surrounding said convoluted metal hose, said braid being welded to said elongated device and fitting snugly over said convoluted metal hose.

5. The termination of claim 4 and a braid retainer surrounding said braid in said area where said hose flexes.

6. A feed-through weld adaptor for a convoluted metal hose, said hose having an initial unconvoluted end section terminated in a radius of a convolution, said adaptor comprising an end section which is complementary to said unconvoluted end section in order to snugly fit over said end section of said hose, said adaptor having a bore terminating on one end in a step which is substantially the same as a wall thickness of said hose to make a smooth transition from said bore to said hose, said bore terminating on an opposite end in substantially the same radius as the said radius of convolution that terminates said hose whereby there is a rolling contact between said hose and said adaptor, a first portion of said initial unconvoluted end section of said hose being bonded to said adaptor beginning at said step, and a remainder of said initial unconvoluted end section of said hose being unbonded with respect to said bore.

7. The adaptor of claim 6 wherein said bonding is welded at said step in said bore between said hose and said adaptor, the area that is heated during said welding being isolated from said radiused area at the opposite end of the adapter by a distance substantially equal to said remainder of said initial end section.

8. The adaptor of claim 7 and a braid snugly fitted over said adaptor and said convoluted metal hose.

* * * * *